UNITED STATES PATENT OFFICE.

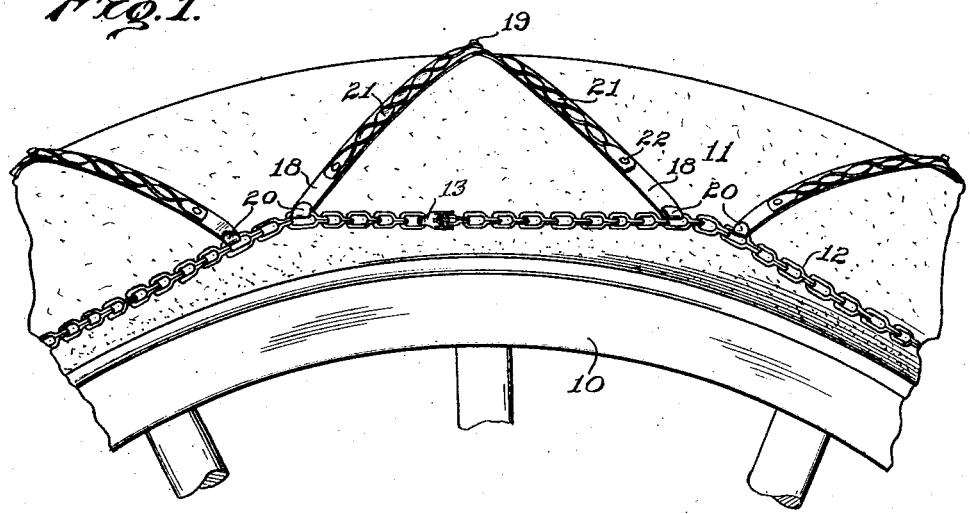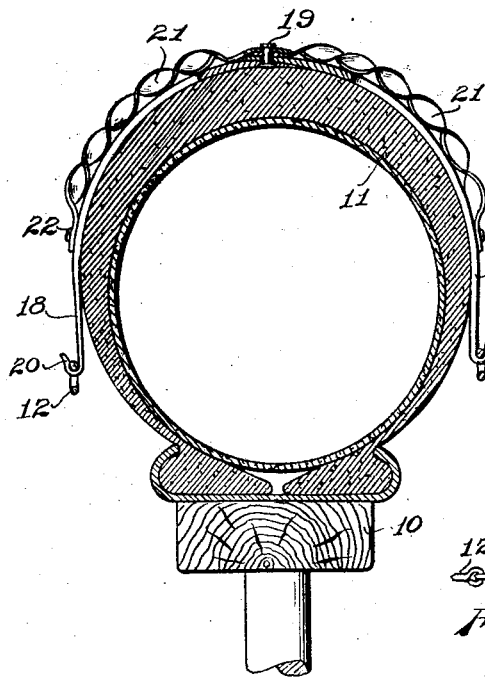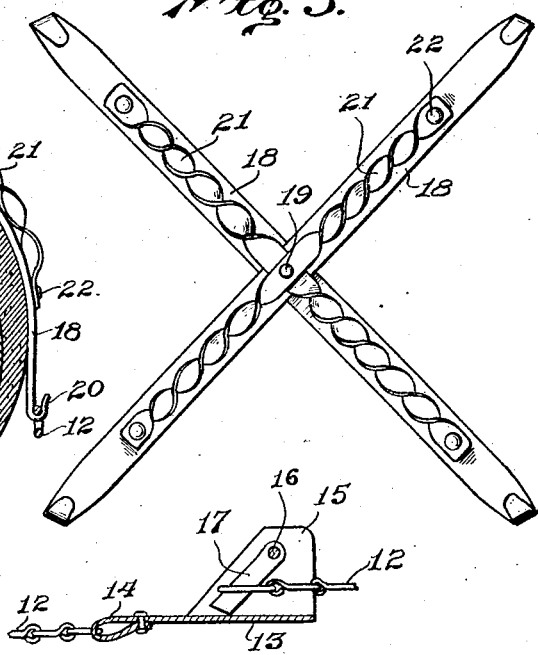

CLYDE I. PEAK, OF BARADA, NEBRASKA.

NONSKID CHAIN.

1,419,751.   Specification of Letters Patent.   Patented June 13, 1922.

Application filed August 24, 1921. Serial No. 494,875.

*To all whom it may concern:*

Be it known that I, CLYDE I. PEAK, citizen of the United States, residing at Barada, in the county of Richardson and State of Nebraska, have invented certain new and useful Improvements in Nonskid Chains, of which the following is a specification.

This invention relates to an improved non-skid chain for motor vehicles and has as one of its principal objects to provide a simple and effective device of this character which will prevent side slipping as well as also prevent spinning of the drive wheels of a vehicle.

A further object of the invention is to provide a device employing pairs of cross strips and wherein each pair of strips may be swung upon each other and engaged in adjusted position with the side chains of the device for varying the effective length of the strips so that the device may be fitted to different tires.

And the invention has as a still further object to provide a device wherein the pairs of cross strips will be equipped with traction elements.

Other and incidental objects will appear hereinafter.

In the drawing:

Figure 1 is a fragmentary side elevation showing my improved device in connection with an ordinary wheel and tire.

Figure 2 is a transverse sectional view,

Figure 3 is a plan view showing a typical pair of cross strips as employed in the device, and Figure 4 is a fragmentary section showing one of the catches employed for connecting the ends of the side chains of the device.

Referring now more particularly to the drawing, I have, for convenience, shown the invention in connection with an ordinary wheel 10 and tire 11, the device being particularly adapted for use in connection with pneumatic tires as now in common use. In carrying the invention into effect, I employ side chains or members 12 which, when the device is applied, extend at opposite sides of the tire. Secured to one end of each of said chains is a catch comprising a catch body 13 of suitable resilient sheet metal, the catch body being, as shown in Figure 4, extended to form a loop 14 which is engaged through the terminal link at the adjacent end of the chain and is secured by a rivet or other approved fastening device. Bent up from the catch body is a pair of confronting lugs 15 between which is arranged to extend a cross pin 16 and mounted to swing upon said pin is a dog 17 movable to abut at its free end against the catch body and engageable through the terminal link at the opposite end of the chain. Thus, as will be seen, the catches provide a means whereby the ends of the chains respectively may be readily connected or disconnected so that the device may be easily applied or removed.

In conjunction with the side chains 12, I employ a number of pairs of longitudinally bowed cross straps 18. These straps are preferably formed of strips of suitable resilient sheet metal and the straps of each pair are, as shown in Figures 2 and 3, crossed to intersect at a point substantially midway between the ends thereof and are swingingly connected by a suitable pivot pin 19 extending through the straps at their intersection. The end portions of the straps are reduced and bent up to provide hooks 20 detachably engageable through the links of the side chains 12 for connecting the straps with the chains and mounted upon each pair of straps is a pair of traction elements 21. These traction elements are also preferably formed of strips of suitable resilient sheet metal and are crossed to intersect at points substantially midway between the ends thereof, being secured to the straps by the pivot pins 19 extending through said elements at their intersection. The end portions of the elements are twisted to provide helical traction vanes and securing said elements at their ends to the straps are rivets or other suitable fastening devices 22.

As will now be observed upon reference to Figure 1, the pairs of cross straps are arranged in relatively close relation and extend across the tread of the tire 11 for supporting the traction elements 21 to come in contact with the ground as the wheel revolves. The traction elements will, therefore, provide effective traction for the wheel, the helical traction vanes of said elements being adapted to sink or bite into the ground. The projecting ends of the pairs of straps are preferably arranged quite close together so that when the ends of the side chains are connected, the reaches of the chain between said ends will be tensioned for holding the end portions of the straps against or near the sides of the tire and in this connection, attention is directed to the fact that by detaching the pairs of cross straps from the side chains and swinging each pair of straps upon each other to vary the angularity thereof, the effective length of the cross straps may, in turn, be varied so that the device may accordingly be adjusted to fit different sized tires, the catches securing the side chains providing, of course, an adjustable connection between the ends of the chains.

Having thus described the invention, what is claimed as new is:

1. A device of the character described including side members, and pairs of crossed pivotally connected straps detachably engaged with said members and adjustable therealong whereby the angularity of the straps of each pair may be varied.

2. A device of the character described including side members, pairs of crossed pivotally connected straps extending between the members, and longitudinally directed traction elements carried by the straps.

3. A device of the character described including side members, pairs of crossed pivotally connected straps extending between the members, and a pair of crossed pivotally connected traction elements carried by each pair of straps.

4. A device of the character described including side members, pairs of crossed pivotally connected straps extending between the members, and traction elements carried by each pair of straps and provided with helical traction vanes.

5. A device of the character described including side members, pairs of crossed straps extending between said members, means pivotally connecting the straps of each pair, and a pair of crossed traction elements carried by each pair of straps swingingly connected at their intersection by said means.

6. A device of the character described including side members, pairs of crossed straps extending between said members, a pair of crossed strips secured at their ends to each pair of straps and twisted to provide traction vanes, and a fastening device extending through each pair of straps and the pair of strips carried thereby swingingly connecting the straps of each pair and the strips of each pair.

In testimony whereof I affix my signature.

CLYDE I. PEAK. [L. S.]